United States Patent [19]

Wolstein

[11] Patent Number: 4,656,014
[45] Date of Patent: Apr. 7, 1987

[54] PROCESS FOR REDUCING THE $NO_x$ CONTENT IN WASTE GASES

[75] Inventor: Friedrich Wolstein, Essen, Fed. Rep. of Germany

[73] Assignee: Uhde GmbH, Dortmund, Fed. Rep. of Germany

[21] Appl. No.: 711,467

[22] PCT Filed: Jul. 11, 1984

[86] PCT No.: PCT/DE84/00142

§ 371 Date: Feb. 20, 1985

§ 102(e) Date: Feb. 20, 1985

[87] PCT Pub. No.: WO85/00300

PCT Pub. Date: Jan. 31, 1985

[30] Foreign Application Priority Data

Jul. 12, 1983 [DE] Fed. Rep. of Germany ....... 3325041
Feb. 17, 1984 [DE] Fed. Rep. of Germany ....... 3405650

[51] Int. Cl.$^4$ .......................... C01B 21/00; B01J 8/00
[52] U.S. Cl. ..................................... 423/235; 423/239
[58] Field of Search ................... 423/235, 235 D, 239, 423/239 A

[56] References Cited

U.S. PATENT DOCUMENTS 3,887,683  6/1975  Abe et al. ............................. 423/235
4,016,241  4/1977  Nishikawa et al. ................. 423/239
4,160,805  7/1979  Inaba et al. ......................... 422/180

FOREIGN PATENT DOCUMENTS 967330    5/1975   Canada ................................. 423/239
2630202   3/1977   Fed. Rep. of Germany ...... 423/235
2285171   4/1976   France .
2325420   4/1977   France .
51-76166  1/1976   Japan ................................... 423/235
52-12670  1/1977   Japan ................................... 423/235
52-20971  2/1977   Japan ................................... 423/235
883945   12/1961   United Kingdom .

Primary Examiner—Gregory A. Heller
Attorney, Agent, or Firm—Toren, McGeady and Goldberg

[57] ABSTRACT

In a process for reducing the $NO_x$ content of waste gases by a catalytic reduction of the $NO_x$ gases using a washable catalyst, a solution is to be provided, with which, while retaining the advantages of the procedure known from the German Offenlegungsschrift No. 3,107,117, this danger is avoided and which is suitable for use with a large range of waste gases, that is, which in particular is not restricted to nitric acid plants. This is accomplished owing to the fact that the reduction is carried out using unsaturated hydrocarbons at a temperature equal to or less than 180° C.

6 Claims, No Drawings

PROCESS FOR REDUCING THE $NO_x$ CONTENT IN WASTE GASES

TECHNICAL FIELD

The invention relates to a process for reducing the $NO_x$ content in waste gases by means of a catalytic reduction of the $NO_x$, using a washable catalyst.

UNDERLYING STATE OF THE ART

From the German Offenlegungsschrift No. 3,107,117 of the applicant, such a process is known for nitric acid plants, in which the reduction in the $NO_x$ content in waste gases takes place in two steps, a portion of the $NO_x$ gas being dissolved out in the first step by, for example, aqueous sodium hydroxide and the remainder subsequently being reduced catalytically to nitrogen in a second step with addition of ammonia. The catalyst used is alkali resistant and water washable.

This known method is already an improvement over a series of other known methods of treatment, a common feature of which is the fact that the catalysts are heavy metal oxides, especially vanadium and molybdenum oxide, which no longer are active below about 200° C.

Due to the use of ammonia, there is at least a theoretical danger of forming ammonium nitrate and, with it, the risk of an explosion.

DISCLOSURE OF THE INVENTION

The object of the invention is to provide a solution, with which, while retaining the advantages of the known procedure of the German Offenlegungsschrift No. 3,107,117, this danger is avoided and which is suitable for use with a large range of waste gases, that is, which in particular is not restricted to nitric acid plants.

Surprisingly, it has turned out that a quite considerable decrease in the $NO_x$ content is achievable with this procedure.

In a short-term trial with addition of ammonia, the $NO_x$ content of a waste gas with about 600 ppm $NO_x$ was reduced to values below 30 ppm. The temperature of the waste gases was 120°–130° C.

In an inventive process under the same conditions, the $NO_x$ content was reduced to below 20 ppm.

A further advantage of the inventive procedure is the fact that it is possible to do without the use of ammonia, as a result of which the operating costs are reduced.

The invention is designed so as to provide for supplying at least portions of hydrocarbons to the waste gas stream before the reduction. Depending on the area of application, quite small amounts can be used here or the whole of the hydrocarbon requirements can be supplied to the waste gas.

The invention is designed so as to provide that, for the reduction, unsaturated hydrocarbons are taken directly from the waste gas stream. The reduction is carried out using unsaturated hydrocarbons at a temperature equal to or less 180° C.

This latter procedure has a particular advantage, namely the hydrocarbon content in the waste gases is reduced by it at the same time. It is also possible to accomplish that ammonium sulfates or bisulfates, for example, are not formed at all.

It has proven to be particularly advantageous to use as hydrocarbons hydrocarbons with double bonds or triple bonds and/or mixtures of hydrocarbons with double bonds or triple bonds.

In order to achieve good control over the process, the invention also makes provisions for passing the waste gas stream through catalyst granulates and/or between catalyst plates. The latter procedure makes a very high waste gas throughput and inventive treatment possible, as a result of which this procedure is particularly suitable for use with waste gases from power stations or similar plants.

In accordance with the invention, provisions can also be made for mixing the waste gas intimately with hydrocarbons before it enters the catalyst and/or for subsequently admitting the waste gas to an installation for reducing the $SO_2$ content.

The invention is not limited to the procedure described and to the use of the described form of the catalyst. Other refinements can also be used here without departing from the scope of the invention.

EXAMPLES (1) Waste Gas from a Coal Power Plant

Temperature: 130° C.
Catalyst: kco-1934 k/d (activated noble metal catalyst on an aluminum-silicon base).
Space velocity: 20,000 VVh
$NO_x$ content before the catalytic reaction: 650 ppm
$NO_x$ content after the catalytic reaction: more than 20 ppm
Hydrocarbons: ethylene, propylene (2) Waste Gas from a Coal Power Plant Temperature: 130° C.
Catalyst: kco-1934 k/m
Space velocity: 20,000 VVh
$NO_x$ content before the catalytic reaction: about 720 ppm
$NO_x$ content after the catalytic reaction: about 40 ppm
Hydrocarbons: ethylene, propylene (3) Waste Gas from a Nitric Acid Plant Temperature: 170° C.
Catalyst: kco-1934 k/m
Space velocity: 25,000 VVh
$NO_x$ content before the catalytic reaction: 800 ppm
$NO_x$ content after the catalytic reaction: 50 ppm
Hydrocarbons: propylene

I claim:

1. In a process for reducing the $NO_x$ content of waste gases from power plants operated with fossil fuel by means of a catalytic reduction of the $NO_x$ gases using a washable catalyst, wherein the reduction is carried out using a reducing effective amount of unsaturated hydrocarbons at a temperature equal to or less than 180° C., the improvement which comprises obtaining all of the unsaturated hydrocarbons used for the reduction directly from the waste gas stream.

2. The process of claim 1 wherein hydrocarbons with double bonds or triple bonds are used as hydrocarbons.

3. The process of claim 2 wherein mixtures of hydrocarbons with double bonds and triple bonds are used as hydrocarbons.

4. The process of claim 1 wherein the waste gas stream is passed through a bed of catalyst granulates in order to reduce it catalytically.

5. The process of claim 1 wherein in the waste gas stream is passed between catalyst plates.

6. The process of claim 1 wherein the waste gas is intimately mixed with the hydrocarbons before it enters the catalyst.

* * * * *